(12) United States Patent
Chung et al.

(10) Patent No.: US 7,978,681 B2
(45) Date of Patent: Jul. 12, 2011

(54) NETWORK APPARATUS, SYSTEM AND METHOD FOR DISCOVERING PATH MTU IN DATA COMMUNICATION NETWORK

(75) Inventors: Woon-jae Chung, Gunpo-si (KR); Byung-in Mun, Suwon-si (KR); Rajesh Patharkar, Maharashtra (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1070 days.

(21) Appl. No.: 10/901,247

(22) Filed: Jul. 29, 2004

(65) Prior Publication Data

US 2005/0041635 A1 Feb. 24, 2005

(30) Foreign Application Priority Data

Aug. 6, 2003 (KR) .................. 10-2003-0054477

(51) Int. Cl.
*H04L 12/28* (2006.01)
(52) U.S. Cl. ......... 370/351; 370/229; 370/251; 370/254
(58) Field of Classification Search .................. 370/229, 370/241, 254, 259, 351, 464, 901, 908, 912, 370/546
See application file for complete search history.

(56) References Cited

U.S. PATENT DOCUMENTS

| 5,425,023 | A | 6/1995 | Haraguchi et al. | |
|---|---|---|---|---|
| 5,892,753 | A | 4/1999 | Badt et al. | |
| 6,650,640 | B1 * | 11/2003 | Muller et al. | 370/392 |
| 2004/0008664 | A1 * | 1/2004 | Takahashi et al. | 370/351 |
| 2004/0071140 | A1 * | 4/2004 | Jason et al. | 370/392 |
| 2004/0090922 | A1 * | 5/2004 | Jason et al. | 370/252 |

FOREIGN PATENT DOCUMENTS

| CN | 1494296 A | 5/2004 |
|---|---|---|
| EP | 1 011 243 A1 | 6/2000 |
| JP | 11-163947 A | 6/1999 |
| JP | 2003-018205 A | 1/2003 |
| JP | 2003-18216 A | 1/2003 |
| WO | WO 03/043289 A2 | 5/2003 |

* cited by examiner

*Primary Examiner* — Pankaj Kumar
*Assistant Examiner* — Lonnie Sweet
(74) *Attorney, Agent, or Firm* — Sughrue Mion, PLLC

(57) ABSTRACT

An apparatus, system, and method for discovering a path MTU in a data communication network, wherein a path MTU option header is included in a signal message or first data packet and thus a MTU suitable for a routing path can be determined. A network apparatus for discovering a path MTU maximum transmission unit (MTU) in a data communication network, including a MTU-comparing unit MTU-comparer detecting a path MTU recorded on a predetermined packet transferred over a routing path between a source node and a destination node and comparing the detected path MTU with an internal MTU stored in the MTU-comparing unit MTU-comparer; and an event-processing unit event-processor updating the path MTU recorded on the predetermined packet to contain the internal MTU if the detected path MTU is larger than the internal MTU.

18 Claims, 11 Drawing Sheets

NETWORK APPARATUS, SYSTEM AND METHOD FOR DISCOVERING PATH MTU IN DATA COMMUNICATION NETWORK

This application claims priority of Korean Patent Application No. 10-2003-0054477 filed on Aug. 6, 2003 in the Korean Intellectual Property Office, the disclosure of which is incorporated herein in its entirety by reference.

BACKGROUND OF THE INVENTION

1. Field of Invention

The present invention relates to a system and a method for discovering a path maximum transmission unit (MTU) in a data communication network, and more particularly, to a system and a method for discovering a path MTU in which the path MTU is stored in a signal message, such as a binding update (BU) message, or a header of a general data packet and the path MTU is updated for every packet transmission path.

2. Description of the Related Art

To send a packet to a destination node, a source node performs fragmentation of the packet into fragmented packets with a size smaller than the maximum transmission unit (hereinafter referred to as 'MTU') of the source node and sends the fragmented packets to the destination node, based on an address system of IPv6 (Internet Protocol version 6). At this time, the packet fragmentation can be performed only at the source node and all other nodes on a path cannot perform such a packet fragmentation. It is because a heavy load may be applied to intermediate nodes if the intermediate nodes, including routers, are forced to fragment received packets with sizes larger than their own MTUs into packets with the sizes of MTUs and to transmit the fragmented packets. Thus, packet fragmentation is originally prevented at the intermediate nodes.

In this context, an intermediate or destination node that has received a packet compares the size of the received packet with its own MTU. If the MTU is smaller than the packet size, the intermediate or destination node sends an Internet control message protocol (ICMP) error message to a source node so that the source node decreases its own MTU. If a path consists of 5 terminals including source, destination and intermediate nodes, ICMP error messages may be created up to four times at maximum. Every time a message is created, the source node should readjust its own MTU and resend a packet.

FIG. 1 is a view illustrating a path for transmitting a packet between source and destination nodes 100 and 140. A data communication network shown in FIG. 1 consists of the source node 100, intermediate nodes or routers 110, 120 and 130, and the destination node 140.

The source node 100 generates and sends a packet via the path. Upon receipt of an ICMP error message, the source node decreases its own MTU and resends a resized packet.

Each of the intermediate nodes or routers 110, 120 and 130 compares a received packet with its own MTU. If the received packet is larger than the MTU, the node or router creates an ICMP error message and sends it to the source node 100. The destination node 140 refers to a consumer of the packet generated by the source node 100.

Here, a MTU for a connection link between nodes is referred to as a link MTU. A MTU for a path consisting of several links between the source node 100 and the destination node 140 is referred to as a path MTU. Here, the path MTU has the minimum value among link MTUs between the source node 100 and the destination node 140. In other words, the path MTU represents the maximum size of a packet capable of being sent from the source node 100 to the destination node 140 without packet fragmentation.

At this time, under the address system of IPv6, all the nodes 100, 110, 120, 130 and 140 need to be able to receive and send a packet of at least 1,280 bytes and all other nodes on the path except the source node 100 are not authorized to fragment the packet.

FIGS. 2 and 3 are diagrams illustrating methods of transmitting a packet from a source node to a destination node in the related art. In particular, FIG. 2 illustrates a method of transmitting a packet with a minimum MTU size, and FIG. 3 illustrates a method of determining a path MTU using an ICMP error message and transmitting a packet.

As shown in FIG. 2, a first node 200 that is a source node generates a packet and then fragments the packet on the basis of a minimum packet unit (i.e. 1,280 bytes), to send fragmented packets to a third node 220 that is a destination node. In other words, each of the nodes 200, 210 and 220 on a path sends the packets with a size up to 1,280 bytes at maximum (S230). In this case, a process for discovering a path MTU may be omitted in the first node 200.

As shown in FIG. 3, when the MTU of a first node 300 is 2,500 bytes, and link MTUs between first and second nodes 300 and 310 and between second and third nodes 310 and 320 are 2,000 and 1,500 bytes, respectively, the first node 300 that is a source node generates a packet and sends a packet to the second node 310 according to its own MTU (i.e. 2,500 bytes) (S330). At this time, the second node 310 compares the link MTU of the received packet (i.e. 2,500 bytes) with that of the second node 310 (i.e. 2,000 bytes). If the received packet is larger than the link MTU, the second node discards the packet and sends an ICMP error message (Error code=Packet too big, Acceptable MTU size=2,000) to the first node 300 so that the size of a path MTU can be readjusted (S340).

The first node 300 that has received the ICMP error message decreases the size of a packet to 2,000 bytes based on the path MTU information contained in the ICMP error message, and sends the packet with a decreased size to the second node 310 (S350). At this time, the second node 310 forwards the received packet to the third node 320 since the size of the received packet (i.e. 2,000 bytes) is equal to the link MTU of the second node (S350). The third node 320 discards the received packet and sends an ICMP error message (Error code=Packet too big, Acceptable MTU size=1,500) to the first node 300 since the link MTU of the received packet is larger than that (i.e. 1,500 bytes) of the third node 320 (S360).

The first node 300 that has received the ICMP error message again decreases the size of a packet to 1,500 bytes and resends the resultant packet to the third node 320 (S370). At this time, the second node 310 sends the received packet to the third node 320 without creating an error message since the size of the received packet is smaller than the link MTU of the second node, and the third node 320 receives the packet from the second node. The method of transmitting the packet shown in FIG. 3 is based on the address system of IPv6.

The method illustrated in FIG. 2 can be easily implemented and an ICMP error message (Packet too big) is not created since the first node 200 as the source node is adapted to send a packet with the minimum MTU (1,280 bytes in this case) that can be sent by all other nodes. However, since an effective processing rate (i.e. bandwidth) of the path cannot be maximally utilized and packets are transmitted in a limited manner, throughput on the path is deteriorated.

Further, in the method illustrated in FIG. 3, the first node 300 as the source node sends a packet to the receiving node according to its own MTU, and the receiving node compares the size of the received packet with its own link MTU. If the packet size is larger than the link MTU of the receiving node, the receiving node sends an ICMP error message (Error code=Packet too big, Acceptable MTU size=1,500) to the first node 300. This process is repeated until the packet from the first node 300 reaches the third node 340 that is the destination node.

The path MTU determination method illustrated in FIG. 3 poses a problem in that a great deal of network resources are required because a new path MTU determination process should be performed every time a routing path is changed due to the sending node's reception of a redirect message from an intermediate node or router, the breakdown of some nodes, or the generation of handoff (i.e. call transfer) in a mobile communication network.

SUMMARY OF THE INVENTION

The present invention addresses the aforementioned problems posed by a conventional data communication network. An aspect of the present invention is to provide an effective network apparatus, system and method for discovering a path MTU, wherein when a source node moves to a foreign link, a path MTU is determined with only minimum traffic and a packet is sent based on the determined path MTU.

Another aspect of the present invention is to determine a suitable path MTU by causing a path MTU option header to be included in a signal message or a first data packet when a new path MTU should be determined due to change in a routing path, or the like, thereby greatly reducing the number of times ICMP error messages are transmitted and retransmission of data packets in response to the ICMP error messages, and accordingly minimizing a load on a network and system during the transmission and retransmission processes.

Furthermore, a further aspect of the present invention is to enable detection of a path MTU suitable for circumstances by allowing a user to preset a path MTU detection method for discovering a path MTU through an external interface or to use default values of a system.

Consistent with an exemplary aspect of the present invention, there is provided a network apparatus for discovering a path MTU in a data communication network, comprising a MTU-comparing unit for detecting a path MTU recorded in a predetermined packet transferred over a routing path between a source node and a destination node and comparing the detected path MTU with an internal MTU stored in the MTU-comparing unit; and an event-processing unit for updating the path MTU recorded in the predetermined packet to be the internal MTU if the detected path MTU is larger than the internal MTU.

An extension header of the predetermined packet with the path MTU recorded therein may comprise a type field for representing whether a new path MTU is detected; and a path MTU storage field for storing the new path MTU therein to update a path MTU in the path MTU storage field when the new path MTU is detected.

Further, consistent with another exemplary aspect of the present invention, there is provided a system for discovering a path MTU in a data communication network, comprising a source node for transmitting a predetermined packet in order to discover a path MTU on a routing path; a destination node for receiving the predetermined packet, detecting a path MTU recorded in the predetermined packet, storing the detected path MTU therein, and transmitting a response to the predetermined packet to the source node; and a plurality of intermediate nodes positioned on the routing path between the source and destination nodes to forward the predetermined packet.

In the system, each of the intermediate nodes may comprise a MTU-comparing unit for detecting the path MTU recorded in the predetermined packet forwarded over the routing path between the source and destination nodes and comparing the detected path MTU with an internal MTU stored in the MTU-comparing unit; and an event-processing unit for updating the path MTU recorded in the predetermined packet to be the internal MTU if the detected path MTU is larger than the internal MTU.

In the system, an extension header of the predetermined packet with the path MTU recorded therein may comprise a type field for representing whether a new path MTU is detected; and a path MTU storage field for storing the new path MTU therein to update a path MTU in the path MTU storage field when the new path MTU is detected.

Furthermore, consistent with a further aspect of the present invention, there is provided a method for discovering a path MTU in a data communication network, comprising a first step of detecting a path MTU recorded in a predetermined packet transferred over a routing path between a source node and a destination node and comparing the detected path MTU with an internal MTU stored in the MTU-comparing unit; and a second step of updating the path MTU recorded in the predetermined packet to be the internal MTU if the detected path MTU is larger than the internal MTU.

In the method, an extension header of the predetermined packet with the path MTU recorded therein may comprise a type field for representing whether a new path MTU is detected; and a path MTU storage field for storing the new path MTU therein to update a path MTU in the path MTU storage field when the new path MTU is detected.

Moreover, consistent with a still further aspect of the present invention, there is provided a method for discovering a path MTU in a data communication network, comprising a first step of transmitting, by a source node, a predetermined packet to discover a path MTU on a routing path between the source node and a destination node; a second step of, by a plurality of intermediate nodes positioned on the routing path between the source and destination nodes, updating a path MTU recorded in the predetermined packet and forwarding the predetermined packet to the destination node; and a third step of, by the destination node that has received the predetermined packet, detecting the path MTU recorded in the predetermined packet, storing the detected path MTU therein, and transmitting a response to the predetermined packet to the source node.

The second step may comprise the steps of detecting a new path MTU recorded in the predetermined packet transferred over the routing path between the source and destination nodes and comparing the detected new path MTU with an internal MTU stored in one of the intermediate units; and updating the path MTU recorded in the predetermined packet to be the internal MTU if the detected new path MTU is larger than the internal MTU.

In the method, an extension header of the predetermined packet with the path MTU recorded therein may comprise a type field for representing whether the new path MTU is detected; and a path MTU storage field for storing the new path MTU therein to update a path MTU in the path MTU storage field when the new path MTU is detected.

BRIEF DESCRIPTION OF THE DRAWINGS

The above and other aspects and features of the present invention will become apparent from the following description of exemplary embodiments given in conjunction with the accompanying drawings, in which.

DETAILED DESCRIPTION OF THE INVENTION

Hereinafter, exemplary embodiments of the present invention will be described in detail with reference to the accompanying drawings, so that those skilled in the art to which the present invention pertains can more easily implement the present invention.

Figure 1:
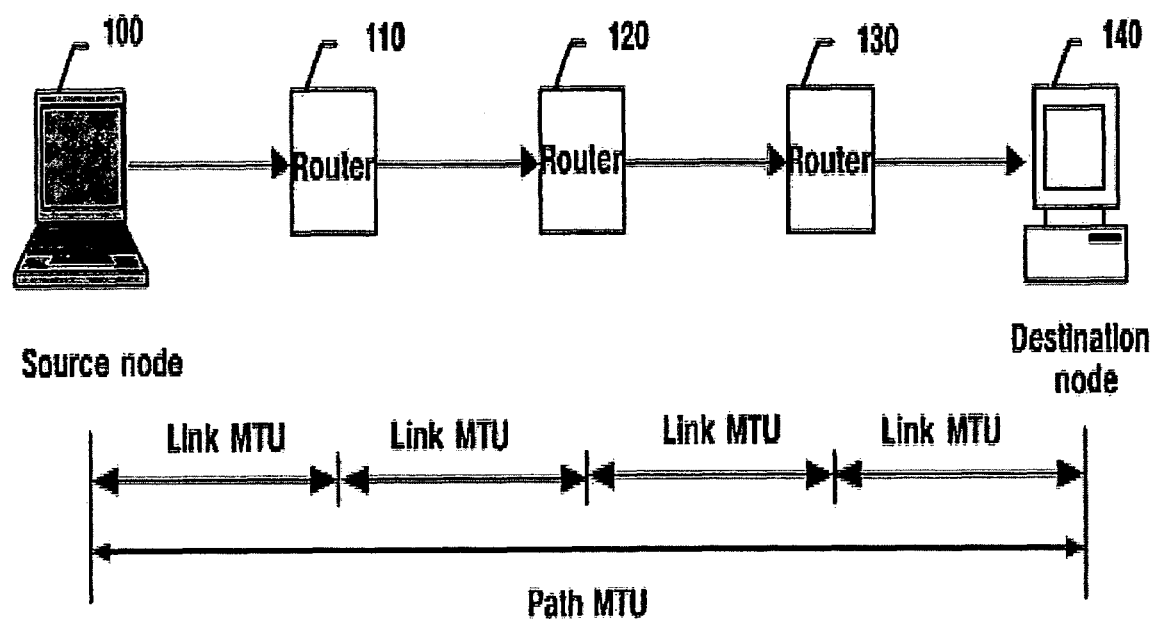
FIG. 1 is a view illustrating a path for transmitting a packet between source and destination nodes.
Figure 2:
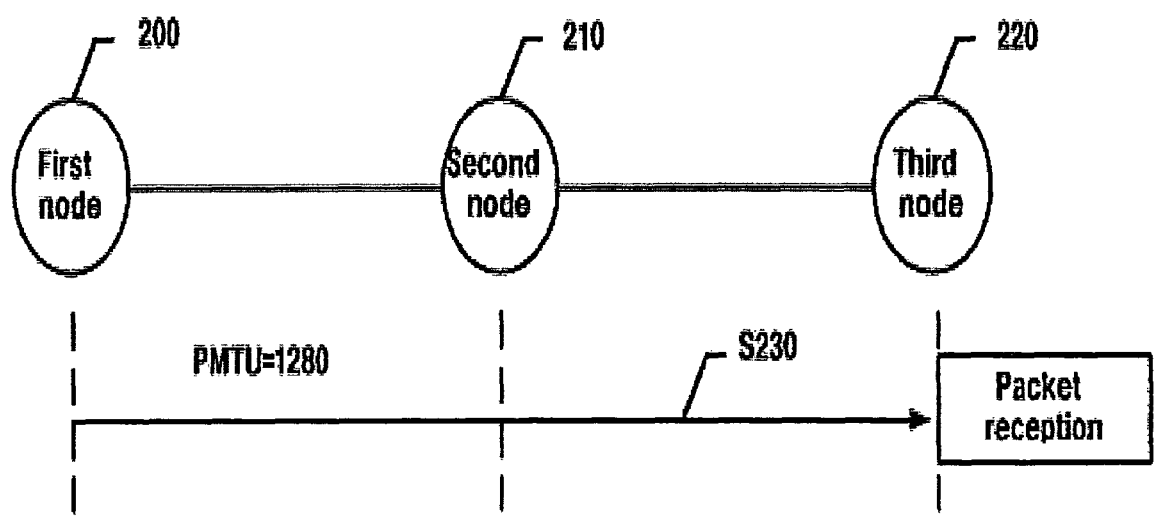
FIG. 2 is a view illustrating a method of transmitting a packet with a minimum MTU size.
Figure 3:
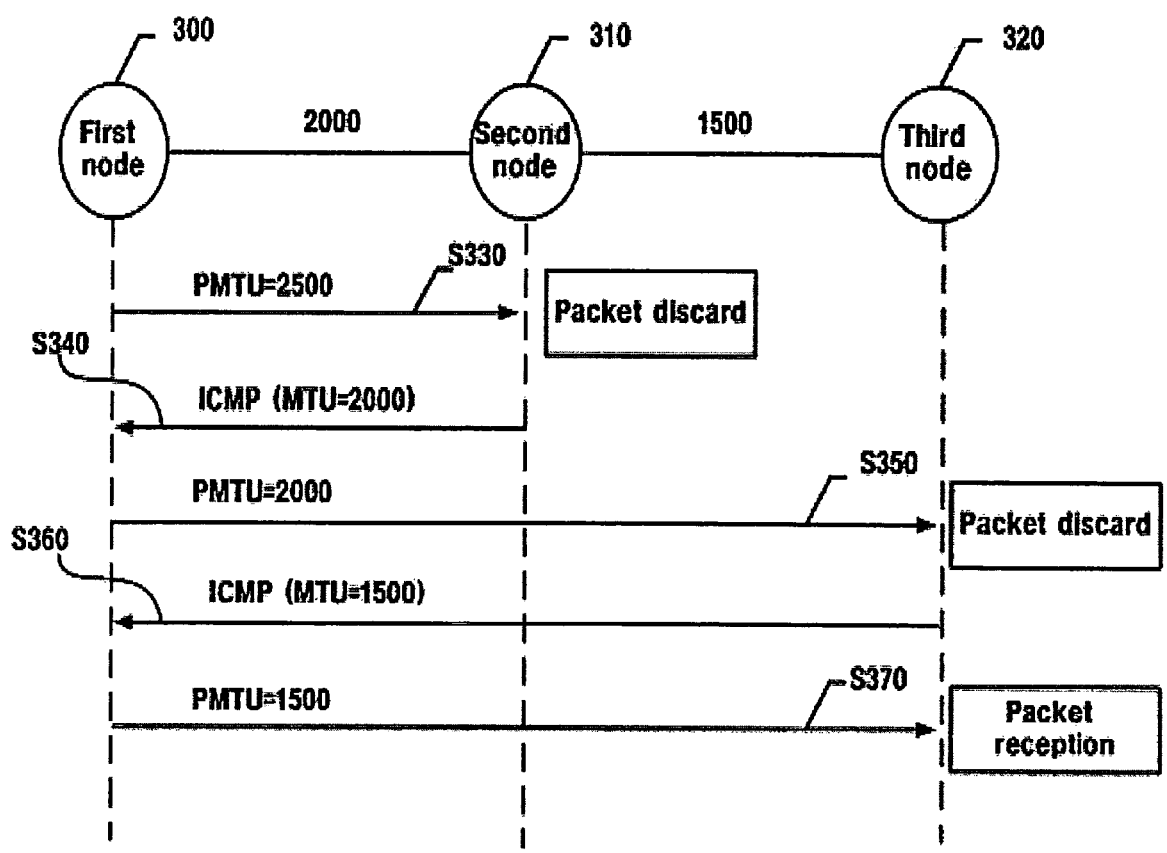
FIG. 3 is a view illustrating a method of determining a path MTU using an ICMP error message and transmitting a packet.
Figure 4:
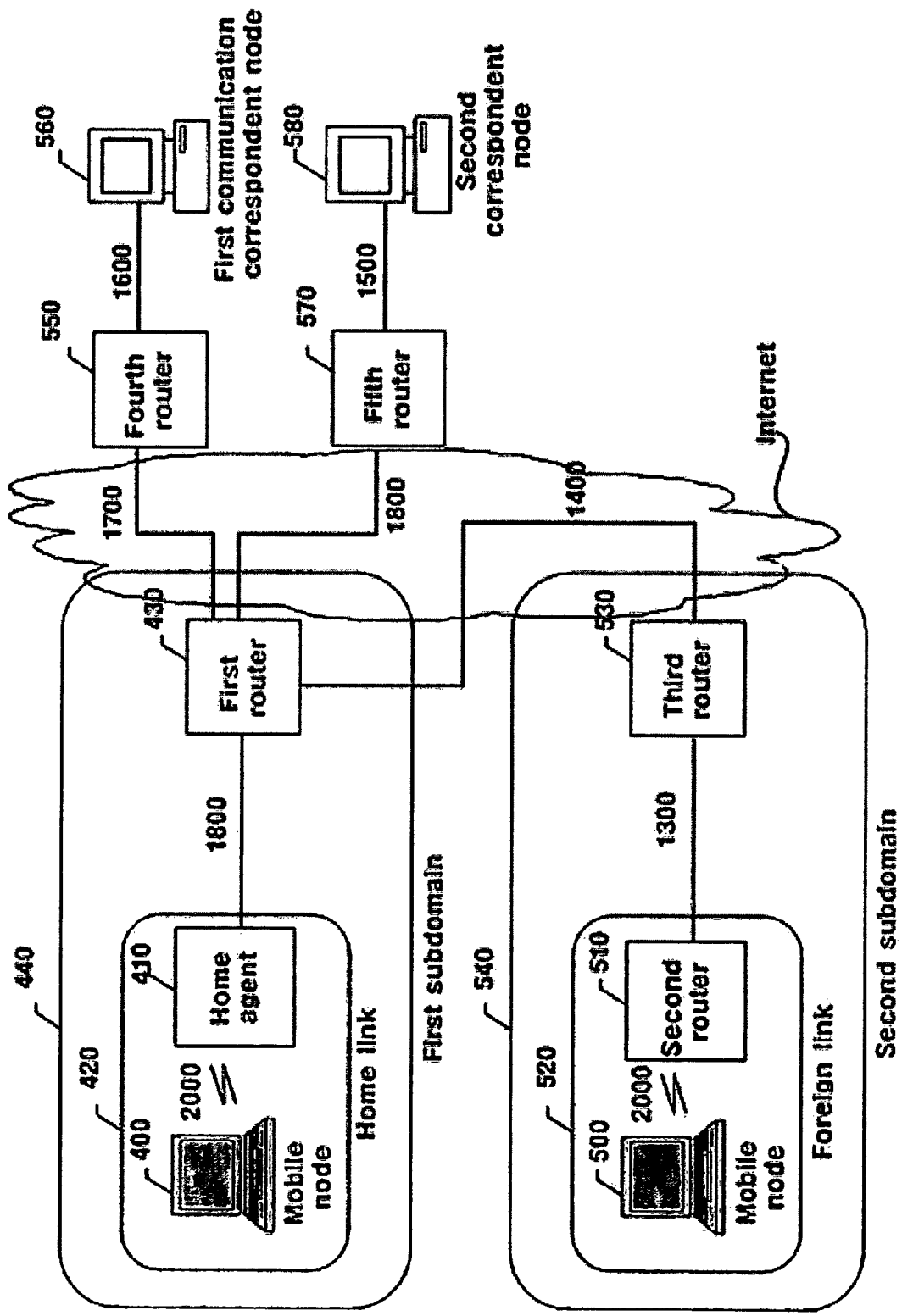
FIG. 4 is a view illustrating determination of a path MTU when a routing path is changed due to movement of a mobile node.

FIG. 4 is a view illustrating determination of a path MTU when a routing path is changed due to movement of a mobile node, on the basis of which an exemplary embodiment of the present invention as illustrated in FIGS. 5a through 9 will be described.

A data communication network shown in FIG. 4 comprises mobile nodes 400 and 500 either of which would be a source node or destination node, correspondent nodes 560 and 580 either of which would be a source node or destination node, first to fifth routers 430, 510, 530, 550 and 570 that would be intermediate nodes, and a home agent 410.

The mobile nodes (MN) 400 and 500 refer to hosts changing their network connection positions. The correspondent nodes (CN) 560 and 580 refer to hosts communicating with the mobile nodes 400 and 500. Here, each of the mobile and correspondent nodes might be either a source node or destination node during packet transmission and reception processes.

A home link 420 is a link in which a subnet prefix of the mobile node 400 is defined, and a standard IP routing mechanism forwards packets, which are to be directed to a home address of the mobile node, to the home link of the mobile node. A foreign link 520 refers to any link other than the home link 420. The first to fifth routers 430, 510, 530, 550 and 570 are devices for interconnecting separate networks that use the same transmission protocol. That is, the routers interconnect network layers.

The home agent 410 refers to a router on the home link 420 of the mobile node 400 in which the mobile node 400 registers a current care-of address (hereinafter, referred to as 'COA') of the mobile node. While the mobile node 400 is separated from the home link 420, the home agent 410 intercepts packets on the home link 420, which are to be directed to the home address of the mobile node 400, encapsulates the intercepted packets and then performs tunneling of the packets to the registered COA of the mobile node. A first subdomain 440 is constructed with the mobile node 400, the home agent 410, the home link 420 and the router 430.

Further, if the mobile node 400 departs from the first subdomain 440 and is then present in a second subdomain 540, the second subdomain 540 is constructed with the mobile node 500, a foreign agent or second router 510 functioning as an agent of the foreign link 520, and a third router 530 that is a gateway for providing a function of Internet connection to the second domain 540.

In addition, there is a first correspondent node 560 communicating with the mobile node via an Internet network and a fourth router 550, and a second correspondent node 580 connected to the Internet network via a fifth router 570.

As shown in FIG. 4, if a routing path is changed due to movement of the mobile node, a new path MTU should be determined instead of an existing path MTU. That is, if the mobile node 400 departs from the home link 420 and then moves into the foreign link 520, a routing path to the first correspondent node 560 is changed from a path consisting of the mobile node 400, the home agent 410, the first router 430, the fourth router 550 and the first correspondent node 560 to a path consisting of the mobile node 500, the second router 510, the third router 530, the first router 430, the fourth router 550 and the first correspondent node 560. The path MTU is also newly updated in response to the change of the routing path. Thus, every time the mobile node 400 moves into the foreign link 520, a new path MTU determination process is required.

Figure 5A:
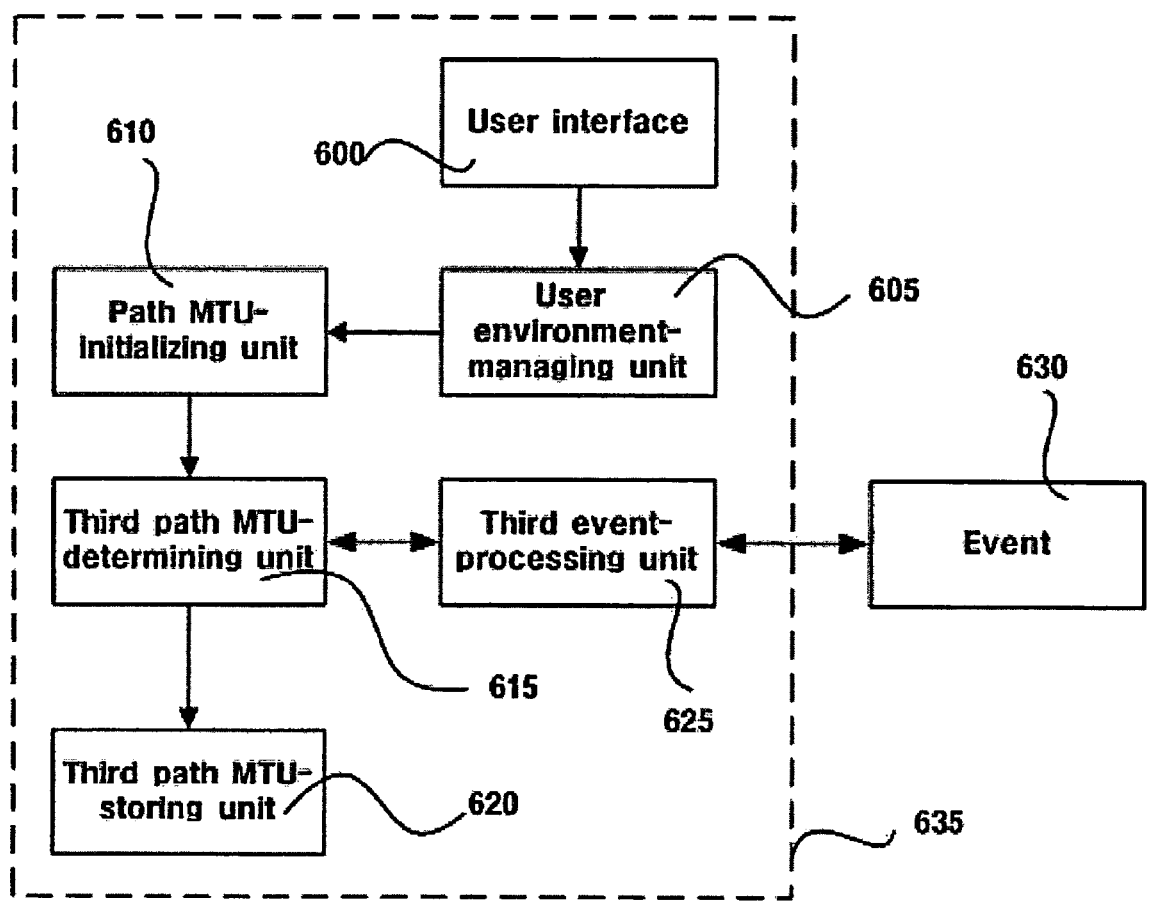
FIGS. 5a to 5c are views showing the configuration of a system for discovering a path MTU in a data communication network consistent with an exemplary embodiment of the present invention.
Figure 5B:
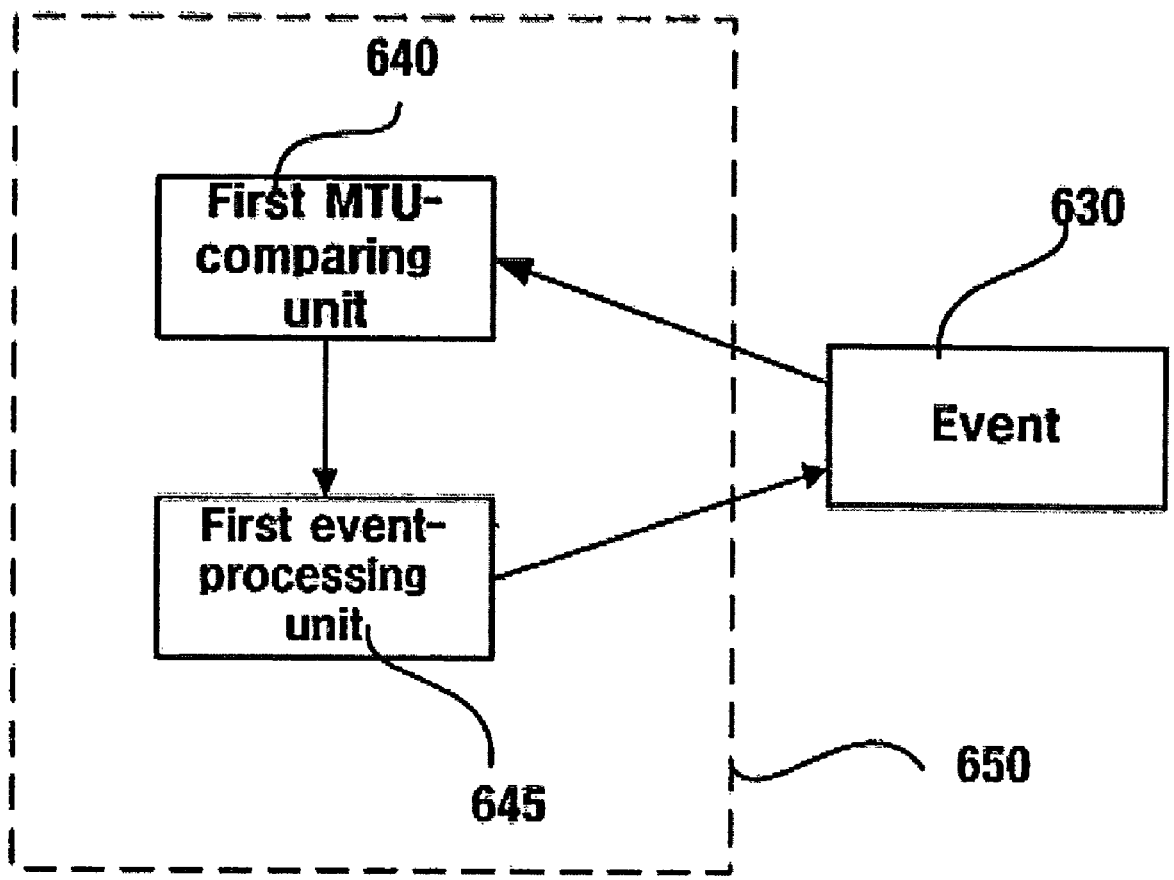
Figure 5C:
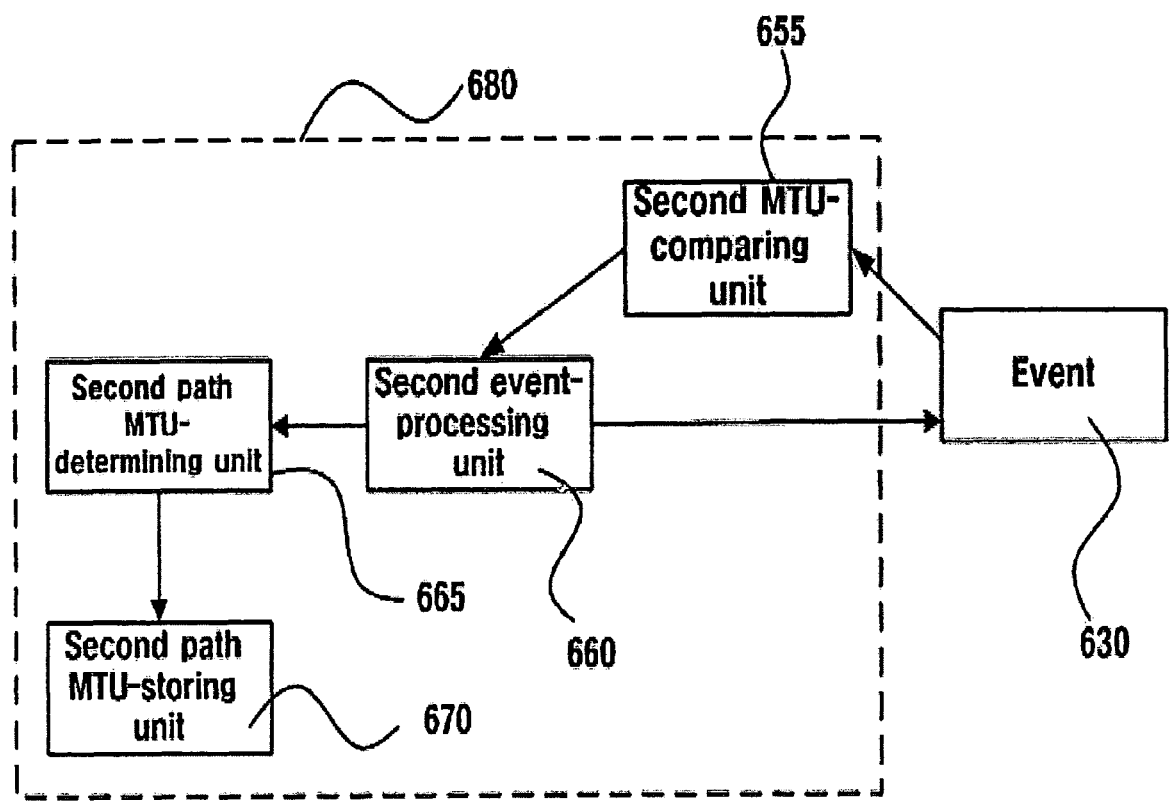

FIGS. 5a to 5c are views showing the configuration of a system for discovering a path MTU in a data communication network consistent with an exemplary embodiment of the present invention.

FIG. 5a is a view showing the configuration of a source or destination node. A source or destination node 635 comprises a user interface 600, a user environment-managing unit 605, a path MTU-initializing unit 610, a third path MTU-determining unit 615, a third path MTU-storing unit 620, and a third event-processing unit 625.

As shown in FIG. 5a, the user environment-managing unit 605 receives input from a user, i.e. the user interface 600, configures and stores environments for a path MTU discovery system, such as selection of a path MTU discovery method.

The path MTU-initializing unit 610 initializes the path MTU discovery system according to system information from the user environment-managing unit 605. For example, the path MTU-initializing unit 610 functions to initialize a path MTU cache, select a path MTU discovery method by which a path MTU is detected by sending a predetermined packet on a routing path, and initialize a maximum packet size (of which the default value is 1,280 bytes) capable of being transmitted and a period of iterative execution of a path MTU discovery process in order to discover a path MTU.

The third path MTU-determining unit 615 determines whether any path MTU discovery is required. The third path MTU-determining unit 615 records the initial value (i.e. "NULL) of the path MTU in a predetermined packet transmitted over the routing path according to a path MTU discovery method that is set in the user environment-managing unit 605 to discover the path MTU. By way of example, the predetermined packet for use in the path MTU discovery method consistent with the exemplary embodiment of the present invention may be a signal message or a data packet. The signal message may include a binding update (hereinafter referred to as 'BU') message. The path MTU is set in the signal message and an extension header of the data packet.

The third event-processing unit 625 sends or receives an event 630 externally. The event 630 refers to all the signals that are input or output into or from the source or destination node. In the exemplary embodiment of the present invention, the event 630, may include a router solicitation message, a router advertisement message, a BU message, a binding acknowledge (hereinafter referred to as 'BA') message, a data packet, an ICMP error message, and the like.

The event 630 may also be the predetermined packet on which the path MTU is recorded. Accordingly, when the third event-processing unit 625 receives a signal, which notifies a need for discovering a path MTU, from the third path MTU-determining unit 615, it sends a predetermined packet on which an initial value of the path MTU is recorded, to the outside.

When the third event-processing unit 625 receives a predetermined packet on which a path MTU between the source and destination nodes is recorded, it detects the path MTU from the predetermined packet. The detected path MTU is forwarded to the third path MTU-determining unit 615. The third path MTU-determining unit 615 performs fragmentation of the packet according to the size of the detected path MTU. The path MTU-storing unit 620 stores the detected path MTU therein and in an extension header of the predetermined packet.

FIG. 5b is a view showing the configuration of a router among intermediate nodes. As shown in FIG. 5b, a router 650 comprises a first MTU-comparing unit 640 and a first event-processing unit 645.

An event 630, i.e. a predetermined packet for discovering a path MTU, is externally input into the first MTU-comparing unit 640. The first MTU-comparing unit 640 detects the path MTU recorded on the predetermined packet and compares it with the link MTU of the first MTU-comparing unit. If the path MTU is larger than the link MTU, the first MTU-comparing unit instructs the first event-processing unit 645 to update the path MTU.

The first event-processing unit 645 updates the path MTU, which has been recorded on the predetermined packet, to contain its own link MTU. The first event-processing unit 645 also forwards the updated packet to any other intermediate node on the routing path.

FIG. 5c is a view showing the configuration of a home agent among intermediate nodes. As shown in FIG. 5c, a home agent 680 comprises a second MTU-comparing unit 655, a second event-processing unit 660, a second path MTU-determining unit 665 and a second path MTU-storing unit 670.

An event 630, i.e. a predetermined packet for discovering a path MTU, is externally input into the second MTU-comparing unit 655. The second MTU-comparing unit 655 detects a path MTU recorded on the predetermined packet and compares it with a link MTU of the second MTU-comparing unit or a path MTU of a predetermined node interval. The second MTU-comparing unit 655 forwards a comparison result to the second event-processing unit 660.

If the path MTU recorded on the predetermined packet is larger than the link MTU of the second event-processing unit 660 or the path MTU of the predetermined node interval, the second event-processing unit 660 instructs the second path MTU-determining unit 665 to update the path MTU.

The second path MTU-determining unit 665 updates the path MTU recorded on the predetermined packet to contain the link MTU of the second path MTU-determining unit or the path MTU of the predetermined node interval. The updated path MTU is stored in the second path MTU-storing unit 670.

The second path MTU-determining unit 665 also instructs the first event-processing unit 645 to forward the predetermined packet to other intermediate nodes on the routing path. Alternatively, the second path MTU-determining unit 665 instructs the first event-processing unit 645 to transmit a response to the predetermined packet. The predetermined packet may be a signal message or data packet. The signal message, for example, may include a BU message. Thus, the response to the predetermined packet may include a BA message or an ICMP error message.

Figure 6A:
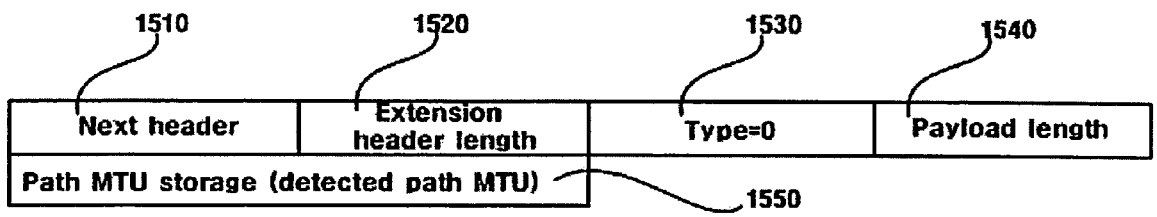
FIGS. 6a and 6b show the format of an extension header of a predetermined packet that is transferred over a routing path to discover a path MTU consistent with an exemplary embodiment of the present invention.
Figure 6B:
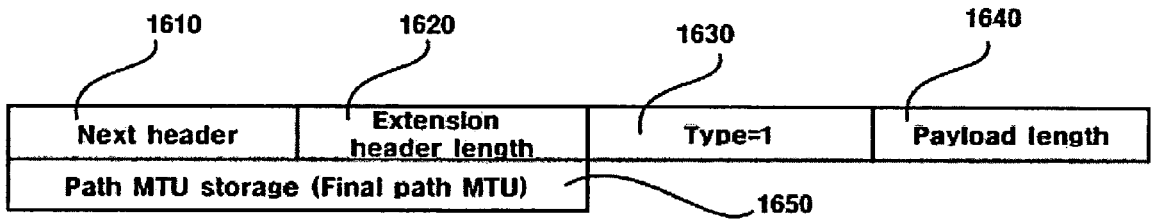

FIGS. 6a and 6b the format of an extension header of a predetermined packet that is transferred over a routing path to discover a path MTU consistent with an exemplary embodiment of the present invention. The present invention is not limited to IPv6.

As shown in FIGS. 6a and 6b, the extension header comprises a next header field 1510 or 1610, an extension header length field 1520 or 1620, a type field 1530 or 1630, a payload length field 1540 or 1640, and a path MTU storage field 1550 or 1650.

FIG. 6a is a view showing a format of an extension header in a case of updating a MTU to discover a path MTU. FIG. 6b is a view showing a format of an extension header when a path MTU has been discovered. The next header field 1510 or 1610 represents the type of a subsequent header. The extension header length field 1520 or 1620 defines the number of bytes of the extension header. The payload length field 1540 or 1640 defines the length of a payload.

The type field 1530 or 1630 represents whether the path MTU discovery system is detecting a path MTU or has discovered a final path MTU of the source and destination nodes. As shown in FIG. 6a, when the path MTU discovery system is detecting the path MTU, the type field 1530 is 0. As shown in FIG. 6b, when the path MTU discovery system has discovered the final path MTU of the source and destination nodes, the type field 1630 is 1.

The path MTU storage field 1550 or 1650 is a field storing therein the detected path MTU. As shown in FIG. 6a, when the path MTU discovery system is detecting the path MTU, the path N=storage field 1550 contains the detected path MTU on the routing path between the source and destination nodes. As shown in FIG. 6b, when the path MTU discovery system has discovered the final path MTU of the source and destination nodes, the path MTU storage field 1650 contains a final path MTU on the routing path between the source and destination nodes.

Figure 7:
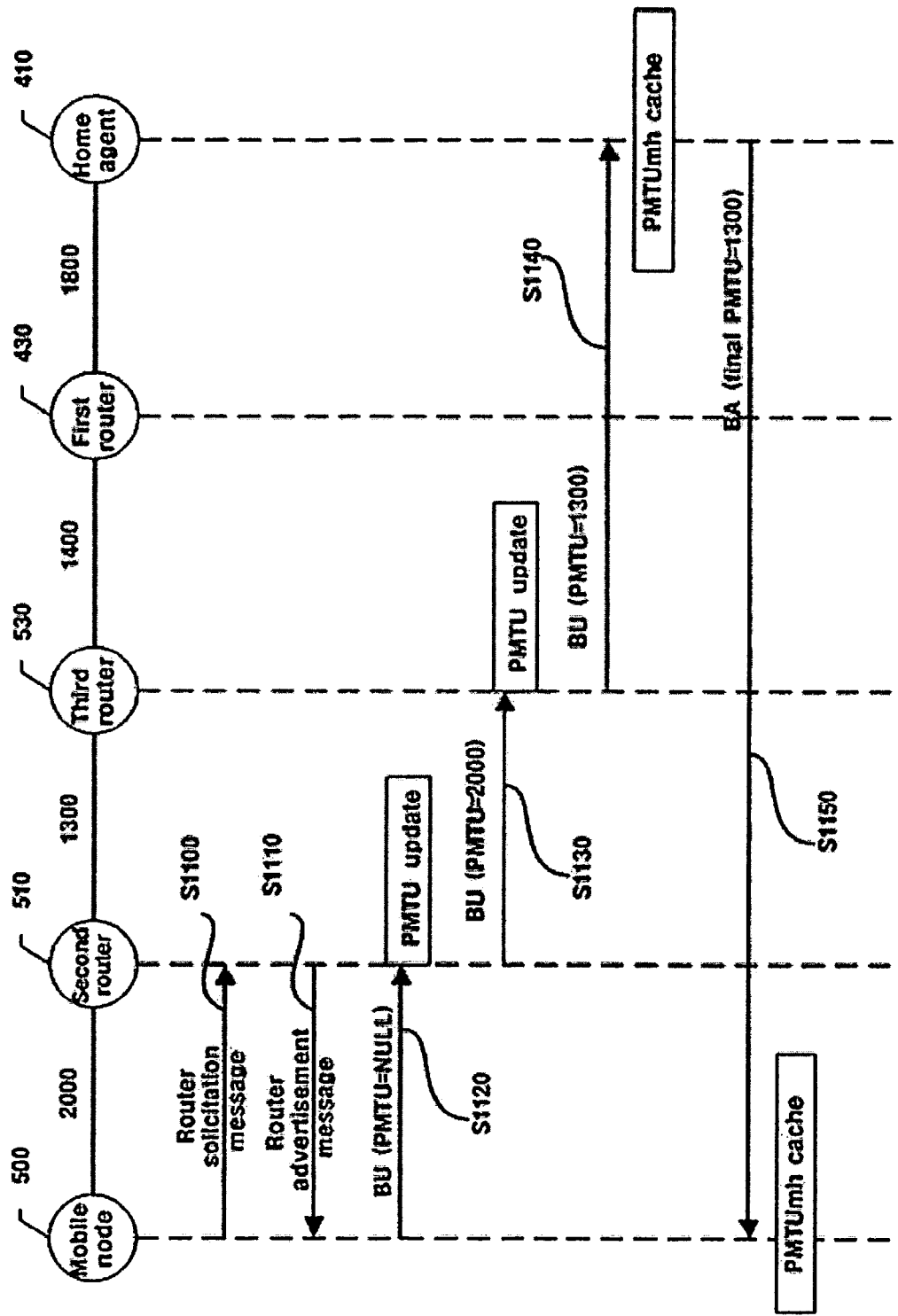
FIG. 7 illustrates a method of detecting a path MTU using a signal message when a routing path is changed due to movement of a host, consistent with an exemplary embodiment of the present invention.
Figure 8:
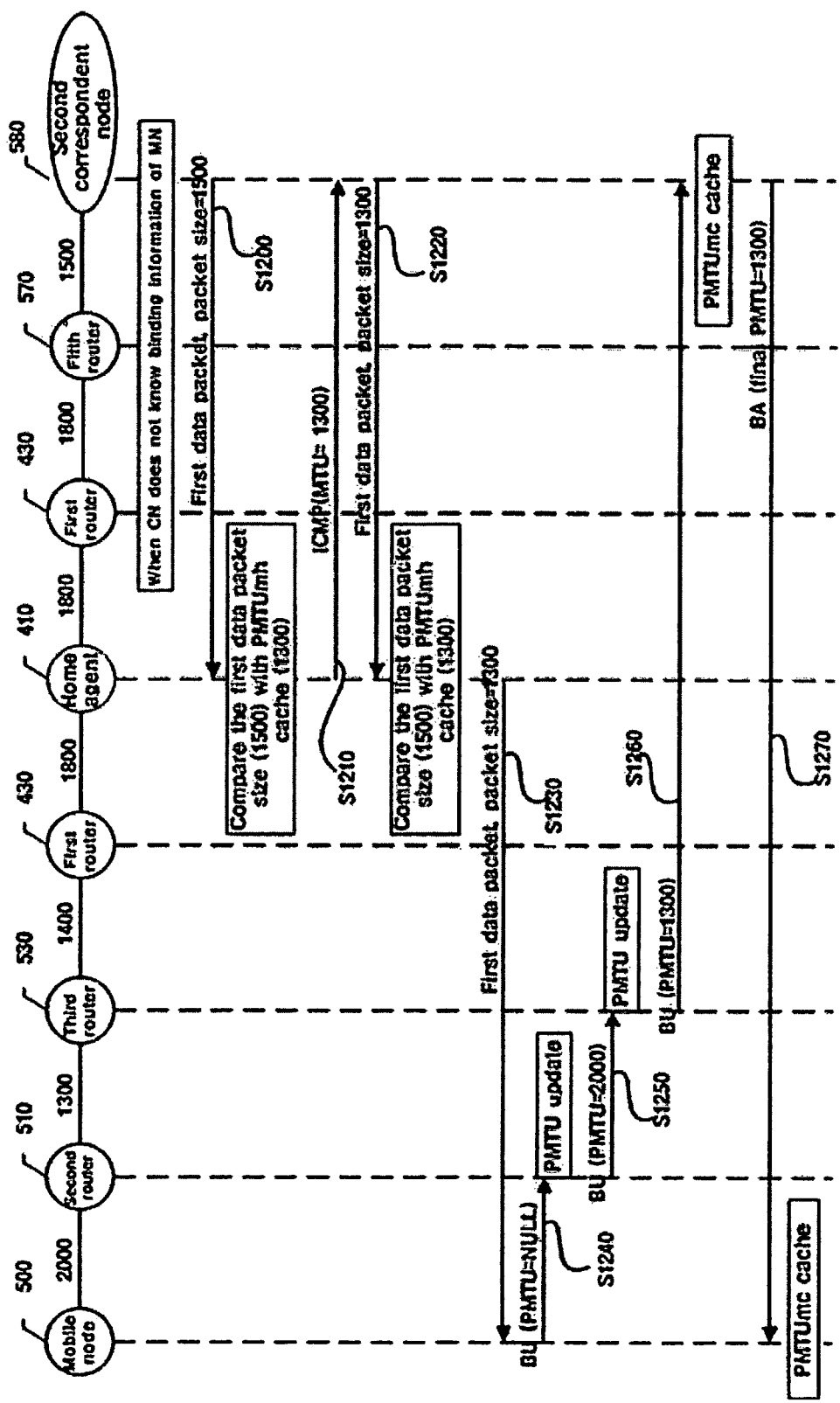
FIG. 8 is a view illustrating a method of determining a path MTU between a mobile node and a correspondent node by using a signal message, consistent with an exemplary embodiment of the present invention.
Figure 9:
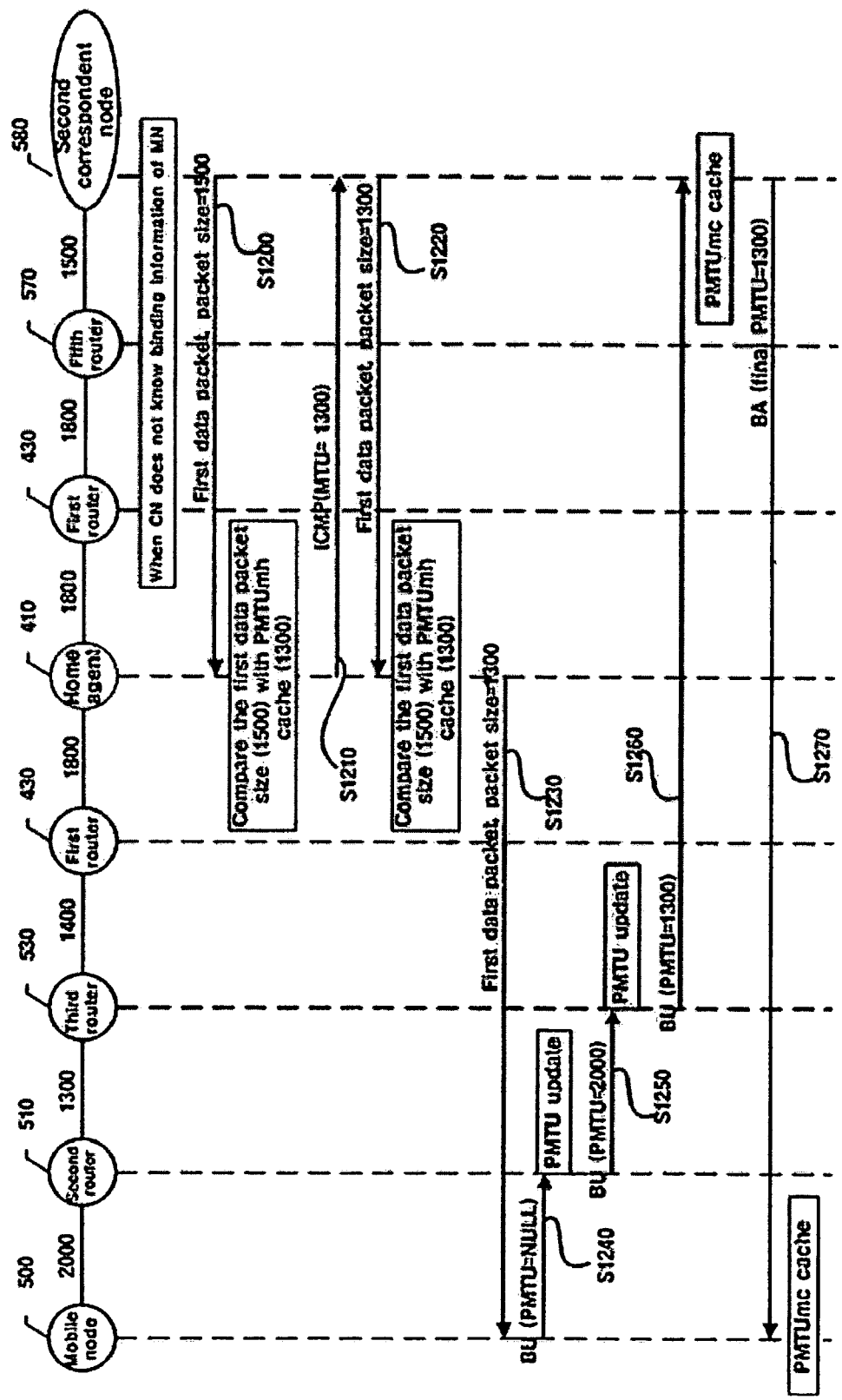
FIG. 9 is a view illustrating a method of determining a path MTU between a mobile node and a correspondent node by using a data packet, consistent with an exemplary embodiment of the present invention.

FIGS. 7 to 9 illustrate methods of determining a path MTU in a data communication network consistent with exemplary embodiments of the present invention. FIGS. 7 to 9 will be described based on the data communication network of FIG. 4.

FIG. 7 illustrates a method of detecting a path MTU using a signal message when a routing path is changed due to movement of a mobile node or a host, consistent with an exemplary embodiment of the present invention. The signal message includes a BU message.

As shown in FIG. 4, when the mobile node 400 present on the home link 420 moves into the foreign link 520, the mobile node 500 sends a router solicitation message to the second router 510 and receives a router advertisement message from the second router 510 (S1100, S1110). The mobile node recognizes from this process that it has moved.

After recognizing the movement, the mobile node 500 acquires a care-of address (COA) through an address auto-configuration, and informs the home agent 410 and the first correspondent node 560 in communication with each other, of the COA by using the BU message.

In this case, the mobile node 500 records an initial value ("NULL") of the path MTU in the signal message and transmits the resultant signal message (S1120). The path MTU is recorded on the extension header of the signal message.

The second router 510 that has received the initial value ("NULL") of the path MTU confirms that the path MTU has the initial value ("NULL"), and updates the path MTU by storing a link MTU (2,000 bytes) of the second router on the path MTU storage field. The second router 510 also forwards the BU message to the third router 510 (S1130).

The third router 530 updates the path MTU storage field to contain its own link MTU (1,300 bytes) of the third router since the path MTU (2,000 bytes) of the received message is larger than the link MTU (1,300 bytes) of the third router. The third router 530 also forwards the BU message to the first router 430 (S1140). In this case, the first router 430 forwards the BU message to the home agent 410 since the path MTU (1,300 bytes) of the received BU message is smaller than the link MTU (1,400 bytes) of the first router (S1140).

Since the path MTU (1,300 bytes) of the received BU message is smaller than the link MTU (1,800 bytes) of the home agent 410, the home agent 410 stores the path MTU recorded on the path MTU storage field of the BU message (i.e. a final path MTU between the mobile node 500 and the home agent 410) (hereinafter referred to as 'PMTUmh') therein.

The home agent 410 also sends a BA message as a response to the BU message to the mobile node 500. With the BA message, the mobile node 500 detects the PMTUmh (1,300 bytes) recorded on the BA message while retaining the binding information (S1150). The mobile node 500 stores the PMTUmh (1,300 bytes), which has been forwarded through the BA message, therein.

The home agent 410 discovers a path MTU between the mobile node 500 and the first correspondent node 560 through the aforementioned path MTU discovery method by forwarding the BU message to the first correspondent node 560 in communication. In this case, the first correspondent node 560 sends a BA message as a response to the BU message to the mobile node 500. In response to the BA message, the mobile node 500 keeps the binding information and discovers the path MTU.

FIG. 8 is a view illustrating a method of determining a path MTU between a mobile node or a host and a correspondent node using a signal message when a routing path is changed due to movement of the mobile node or host, consistent with an exemplary embodiment of the present invention.

FIG. 8 illustrates a method of determining a path MTU between the mobile node 500 and the second correspondent node 580, not in communication with each other, by using a signal message.

First, as illustrated in FIG. 8, the path MTU and binding information between the mobile node 500 and the home agent 410 are kept. The second correspondent node 580 that is not in communication with the mobile node 500 does not recognize a new COA and path MTU of the mobile node 500. Accordingly, the second correspondent node 580 forwards a first data packet having an existing path MTU (1,500 byte) via the home agent 410 to the mobile node 500 (S1200). Since the size of the first data packet (1,500 byte) is not larger than the link MTU of the second correspondent node 580, fifth router 570 and first router 430, the first data packet is sent to the home agent 410 via the fifth router 570 and the first router 430.

At this time, the home agent 410 compares the size of the received first data packet (1,500 bytes) with the size of the final path MTU between the mobile node 500 and the home agent 410, i.e. PMTUmh (1,300 bytes), which is stored in the home agent. Here, since the size of the received first data packet is larger than the PMTUmh, the home agent 410 sends an ICMP error message (Packet too big, MTU=1,300) to the second correspondent node 580 (S1210).

The second correspondent node 580 performs fragmentation of the packet and resends a first data packet having a path MTU of 1,300 bytes (S1220). The size of the first data packet (1,300 bytes) is not larger than the link MTU of the second correspondent node 580, second router 570 and first router 430, the first data packet is sent to the home agent 410 via the fifth router 570 and the first router 430.

At this time, the home agent 410 compares the size of the received first data packet (1,300 bytes) with that of the final path MTU, i.e. PMTUmh (1,300 bytes), stored therein. Since they are of the same, the first data packet arrives at the mobile node 500 via the first router 430, third router 530 and second router 510 (S1230).

When such a process is completed, the binding update process is performed between the mobile node 50Q and the second correspondent node 580, as illustrated in FIG. 7 (S1240~S1270). A description of the binding update process will be omitted herein since it is of the same as illustrated in FIG. 7. However, contrary to the method illustrated in FIG. 7, the home agent 410 forwards the BU message to the second correspondent node 580 in the method illustrated in FIG. 8 since the path MTU of the BU message (1,300 bytes) received from the first router 430 is smaller than the link MTU of the home agent (1,800 bytes) (S1260).

The first router 430, the fifth router 570 and the second correspondent node 580 are subjected to the path MTU-updating process, respectively, and the second correspondent node 580 stores the path MTU recorded in the received BU message (i.e. final path MTU between the mobile and correspondent nodes; hereinafter referred to as "PMTUmc").

The second correspondent node 580 also sends a BA message as a response to the BU message to the mobile node 500. With the BA message, the mobile node 500 detects the PMTUmc (1,300 bytes) recorded in the BA message while keeping the binding information (S1150). When the binding update process is completed, the final path MTU between the mobile node 500 and the second correspondent node 580 becomes 1,300 bytes.

FIG. 9 is a view illustrating a method of determining a path MTU between a mobile node or a host and a correspondent node by using a data packet when a routing path is changed due to movement of the mobile node or host, consistent with an exemplary embodiment of the present invention. The path MTU is detected using the signal message in the exemplary embodiment of the present invention illustrated in FIG. 7, but it is detected using the first data packet in the exemplary embodiment of the present invention illustrated in FIG. 9.

As shown in FIG. 4, if the mobile node 400 present on the home link 420 moves into the foreign link 520, the mobile node 500 sends a router solicitation message to the second router 510 and receives a router advertisement message from the second router 510 (S1300, S1310). The mobile node recognizes from this process that it has moved.

The mobile node 500 acquires a COA through an address auto-configuration after recognizing the movement. With the BU message, the mobile node 500 informs both the home agent 410 and the first correspondent node 500, which is in communication with the mobile node, of the COA (S1320, S1330).

Further, in response to the BU message, the home agent 410 and the first correspondent node 560 send a BA message to the mobile node 500 and keep the binding information (S1320, S1330). When the mobile node 500 completes the binding process with both the home agent 410 and the first correspondent node 560, the mobile node 500, the home agent 410 and the first correspondent node 560 can transfer data packets to one another.

In this case, when the first correspondent node 560 transmits the first data packet to the mobile node 500, it initializes a path MTU storage field in the first data packet to be "NULL," limits the length of a maximum packet (hereinafter referred to as "Lm") and then transmits the first data packet (S1340). Here, in the embodiment of the present invention, the Lm means the length of a maximum data packet capable of being sent on a path without packet fragmentation. A default value of the Lm is 1,280 bytes and may be set to a value smaller than 1,280 bytes in consideration of a tunneling header.

The fourth router 550 that has received the first data packet updates the path MTU storage field ("NULL") of the first data packet to contain its own link MTU (1,600 bytes).

The fourth router 550 also forwards the first data packet to the first router 430. When the first data packet (Path MTU=1, 600 bytes, Packet size=Lm) sequentially passes through the fourth router 550, the first router 430, the home agent 410 and the first router 430, the path MTU (1,600 bytes) of the first data packet is smaller than each of the link MTUs (1,700; 1,800 and 1,800 bytes) between the relevant nodes. Consequently, the path MTU of the received data packet is forwarded to a subsequent node as it is, without being updated (S1350).

Further, since the path MTU (1,600 bytes) of the first data packet is larger than the link MTU (1,400 bytes) of the third router 530 that has received the first data packet, the third router 530 updates the path MTU storage field to contain its own link MTU (1,400 bytes) and then forwards the first data packet to the second router 510 (S1360).

Moreover, since the path MTU (1,400 bytes) of the first data packet is larger than the link MTU (1,300 bytes) of the second router 510 that has received the first data packet, the second router updates the path MTU storage field to contain its own link MTU (1,300 bytes) of the second router and then forwards the first data packet to the mobile node 500 (S1370).

The mobile node 500 that will receive the first data packet accepts the first data packet since the path MTU (1,300 bytes) of the first data packet is smaller than the link MTU (2,000 bytes) of the mobile node 500. The mobile node 500 also stores the path MTU recorded in the first data packet (final path MTU between the mobile and correspondent nodes; PMTUmc) therein.

Further, the mobile node 500 sends a response message of the first data packet to the first correspondent node 560 so as to forward the final path MTU (1,300 bytes) (S1380). The first correspondent node 560 stores the final path MTU (1,300 bytes) forwarded through the response message therein.

The apparatus, system and method for discovering a path MTU in a communication network consistent with the exemplary embodiments of the present invention described above may be applied to a wired network as well as a wireless network.

The present invention suggests a method and system for determining the path MTU between the source and destination nodes using the signal message or first data packet according to user environment settings.

With the system and method for discovering a path MTU in a data communication network consistent with the present invention, time occupying a foreign network can be reduced, thereby effectively using the foreign network without being significantly influenced by the foreign network. Consequently, it is possible to minimize the generation of ICMP error messages (Packet too big) and retransmitted messages involved in the path MTU determination process. This results in a remarkable reduction of network load on a transmission path and minimization of load on each node in packet retransmission.

Furthermore, a path MTU suitable for communication conditions can be detected by allowing a user to preset a path MTU detection method for discovering a path MTU through an external interface or to use default values of the system.

Although the present invention has been described in detail in connection with the exemplary embodiments, it is not limited thereto and those skilled in the art can make various changes and modifications within the scope and technical spirit of the invention.

What is claimed is:

1. A network apparatus for discovering a path maximum transmission unit (MTU) in a data communication network, comprising:
   a MTU-comparer detecting a path MTU recorded on a predetermined packet transferred over a routing path between a source node and a destination node and comparing the detected path MTU with an internal MTU stored in the MTU-comparer; and
   an event-processor updating the path MTU recorded on the predetermined packet to contain the internal MTU if the detected path MTU is larger than the internal MTU,
   wherein an extension header of the predetermined packet with the path MTU recorded thereon comprises:
      a type field representing whether a new path MTU is detected; and
      a path MTU storage field, which is initialized to a null value by at least one of the source node and the destination node, storing the new path MTU therein to update a path MTU in the path MTU storage field when the new path MTU is detected, and
   wherein the predetermined packet comprises at least one of a data packet and a binding update message packet,
   wherein the routing path between the source node and the destination node comprises at least one intermediate node,
   one intermediate node which has received the predetermined packet updates the path MTU in the received predetermined packet if the path MTU in the received predetermined packet is larger than the internal MTU on the one intermediate node and forwards the received predetermined packet to next intermediate node or the destination node.

2. The apparatus as claimed in claim 1, wherein the internal MTU comprises a link MTU.

3. The apparatus as claimed in claim 1, wherein the predetermined packet comprises the binding update signal message packet sent between the source node and the destination node, and
   wherein, in response to receiving the binding update signal message packet, the destination node transmits a binding acknowledgement signal message packet to the source node.

4. The apparatus as claimed in claim 1, wherein the predetermined packet comprises the data packet, the data packet comprising a data packet that is sent first between the source node and the destination node among data packets sent between the source node and the destination node.

5. The apparatus as claimed in claim 1, wherein the internal MTU comprises at least one of a path MTU and a link MTU.

6. The apparatus as claimed in claim 5, wherein the predetermined packet comprises the binding update signal message packet sent between the source node and the destination node, and
wherein, in response to receiving the binding update signal message packet, the destination node transmits a binding acknowledgement signal message packet to the source node.

7. The apparatus as claimed in claim 5, wherein the predetermined packet comprises the data packet, the data packet comprising a data packet that is sent first between the source node and the destination node among data packets sent between the source node and the destination node.

8. A system for discovering a path maximum transmission unit (MTU) in a data communication network, comprising:
a source node transmitting a predetermined packet in order to discover a path MTU on a routing path, the predetermined packet comprising at least one of a data packet and a binding update message packet;
a destination node receiving the predetermined packet, detecting a path MTU recorded in the predetermined packet, storing the detected path MTU therein, and transmitting a response to the predetermined packet to the source node; and
at least one intermediate node positioned on the routing path between the source and destination nodes to forward the predetermined packet,
wherein an extension header of the predetermined packet with the path MTU recorded therein comprises:
a type field representing whether a new path MTU is detected; and
a path MTU storage field, which is initialized to a null value by at least one of the source node and the destination node, storing the new path MTU therein to update a path MTU in the path MTU storage field when the new path MTU is detected,
wherein the routing path between the source node and the destination node comprises at least one intermediate node,
one intermediate node which has received the predetermined packet updates the path MTU in the received predetermined packet if the path MTU in the received predetermined packet is larger than the internal MTU on the one intermediate node and forwards the received predetermined packet to next intermediate node or the destination node.

9. The system as claimed in claim 8, wherein the at least one intermediate node comprises:
a MTU-comparer detecting the path MTU recorded on the predetermined packet forwarded over the routing path between the source and destination nodes and comparing the detected path MTU with an internal MTU stored in the MTU-comparer; and
an event-processor updating the path MTU recorded on the predetermined packet to contain the internal MTU if the detected path MTU is larger than the internal MTU.

10. A method for discovering a path maximum transmission unit (MTU) in a data communication network, comprising:
detecting a path MTU recorded on a predetermined packet transferred over a routing path between a source node and a destination node and comparing the detected path MTU with an internal MTU stored in a MTU-comparer; and
updating the path MTU recorded in the predetermined packet to contain the internal MTU if the detected path MTU is larger than the internal MTU,
wherein an extension header of the predetermined packet with the path MTU recorded therein comprises:
a type field representing whether a new path MTU is detected; and
a path MTU storage field, which is initialized to a null value by at least one of the source node and the destination node, storing the new path MTU therein to update a path MTU in the path MTU storage field when the new path MTU is detected, and
wherein the predetermined packet comprises at least one of a data packet and a binding update message packet,
wherein the routing path between the source node and the destination node comprises at least one intermediate node,
one intermediate node which has received the predetermined packet updates the path MTU in the received predetermined packet if the path MTU in the received predetermined packet is larger than the internal MTU on the one intermediate node and forwards the received predetermined packet to next intermediate node or the destination node.

11. The method as claimed in claim 10, wherein the internal MTU comprises a link MTU.

12. The method as claimed in claim 11, wherein the predetermined packet comprises a signal message.

13. The method as claimed in claim 11, wherein the predetermined packet comprises a data packet.

14. The method as claimed in claim 10, wherein the internal MTU comprises a path MTU.

15. The method as claimed in claim 14, wherein the predetermined packet comprises a signal message.

16. The method as claimed in claim 14, wherein the predetermined packet comprises a data packet.

17. A method for discovering a path maximum transmission unit (MTU) in a data communication network, comprising:
transmitting, by a source node, a predetermined packet to discover a path MTU on a routing path between the source node and a destination node, the predetermined packet comprising at least one of a data packet and a binding update message packet;
updating, by at least one intermediate node positioned on the routing path between the source and destination nodes, a path MTU recorded in the predetermined packet and forwarding the predetermined packet to the destination node; and
detecting, by the destination node that has received the predetermined packet, the path MTU recorded in the predetermined packet, storing the detected path MTU therein, and transmitting a response to the predetermined packet to the source node,
wherein an extension header of the predetermined packet with the path MTU recorded therein comprises:
a type field representing whether the new path MTU is detected; and
a path MTU storage field, which is initialized to an null value by at least one of the source node and the destination node, storing the new path MTU therein to update a path MTU in the path MTU storage field when the new path MTU is detected, wherein the routing path between the source node and the destination node comprises at least one intermediate node, one intermediate node which has received the predetermined packet updates the path MTU in the received predetermined packet if the path MTU in the received predetermined packet is larger than the internal MTU on the one intermediate node and forwards the received predetermined packet to next intermediate node or the destination node.

18. The method as claimed in claim 13, wherein updating, by the at least one intermediate node positioned on the routing path between the source and destination nodes, a path MTU recorded in the predetermined packet and forwarding the predetermined packet to the destination node comprises:

detecting a new path MTU recorded on the predetermined packet transferred over the routing path between the source and destination nodes and comparing the detected new path MTU with an internal MTU stored in the at least one intermediate node; and updating the path MTU recorded on the predetermined packet to be the internal MTU if the detected new path MTU is larger than the internal MTU.

* * * * *